Feb. 25, 1930.  W. W. BUGH  1,748,439
VEHICULAR TRAFFIC SIGNAL SWITCH
Original Filed April 5, 1927   2 Sheets-Sheet 1
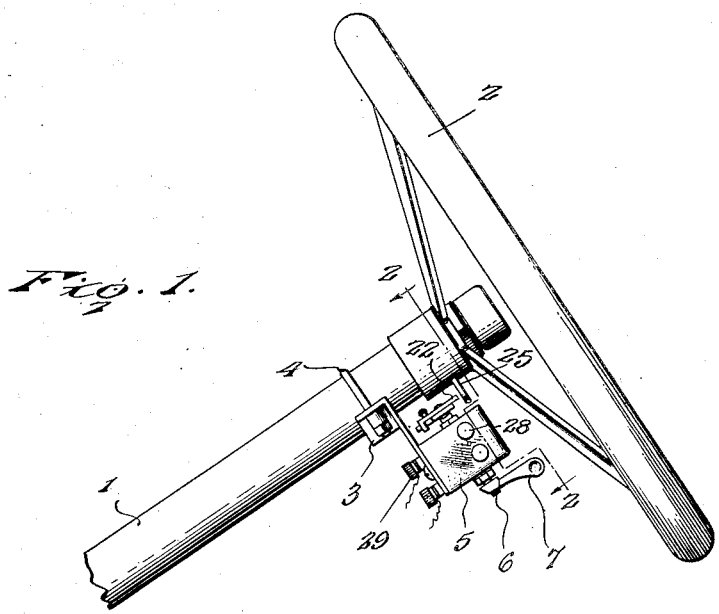
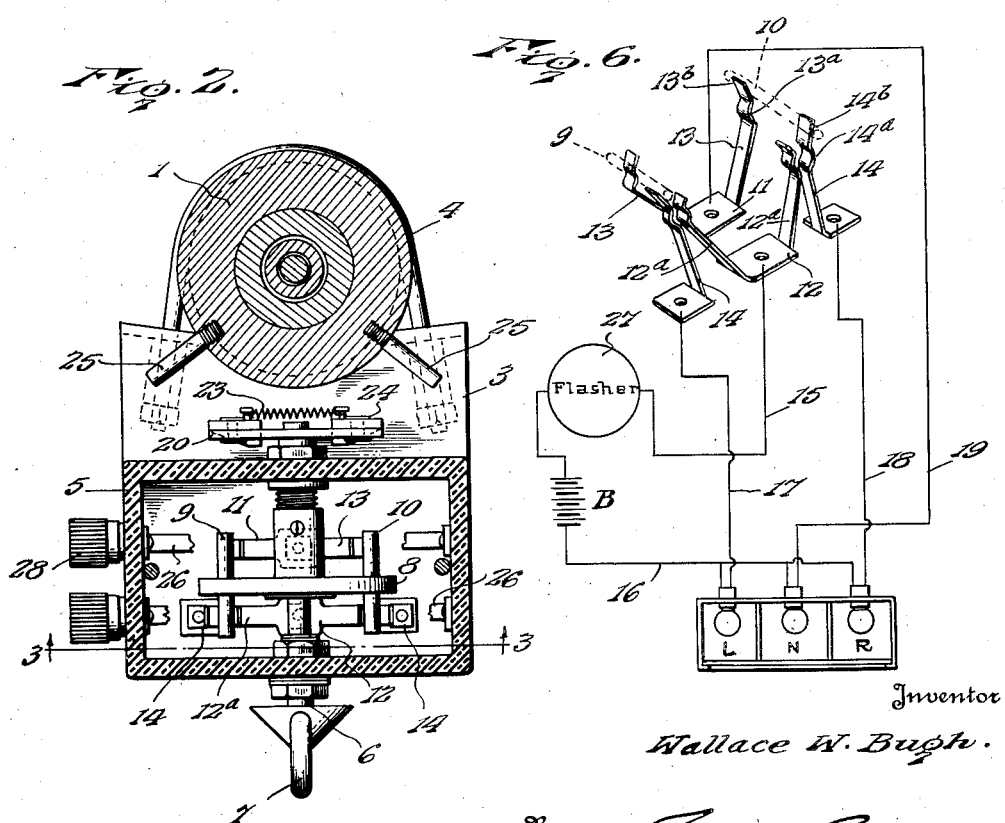
Inventor
Wallace W. Bugh.
By Lacey & Lacey, Attorneys Feb. 25, 1930. W. W. BUGH 1,748,439
VEHICULAR TRAFFIC SIGNAL SWITCH
Original Filed April 5, 1927   2 Sheets-Sheet 2
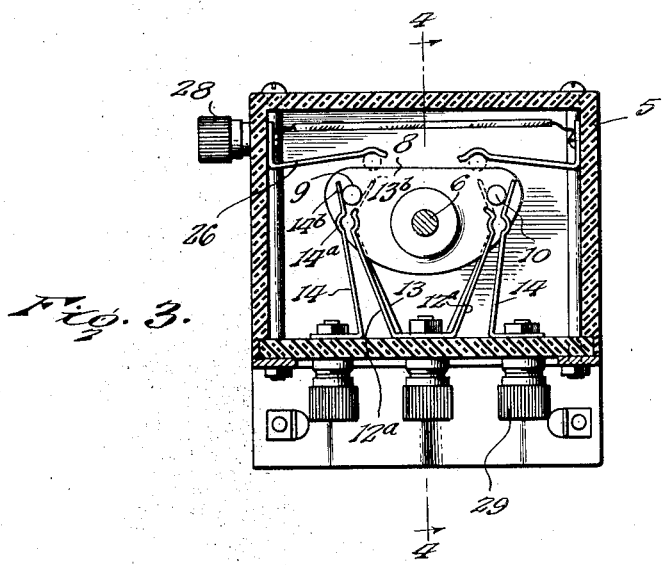
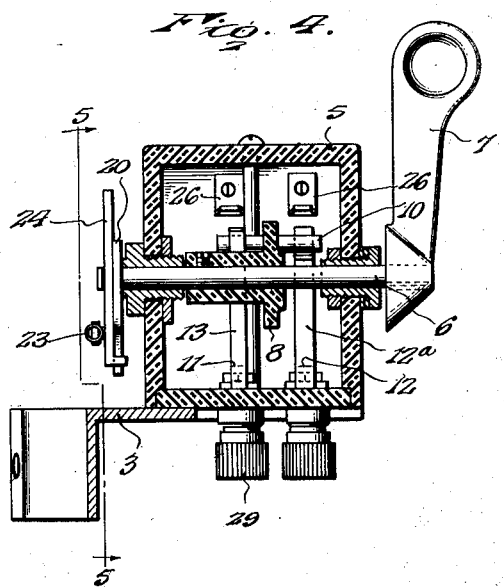
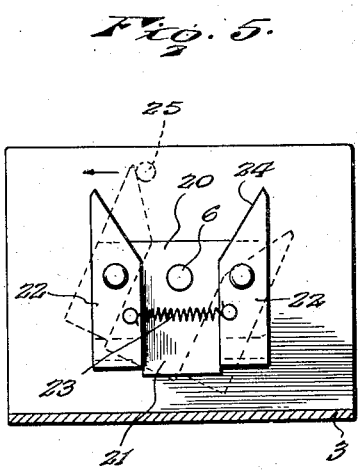
Inventor
Wallace W. Bugh.
By Lacey & Lacey, Attorneys Patented Feb. 25, 1930

1,748,439

UNITED STATES PATENT OFFICE

WALLACE W. BUGH, OF NORTH TONAWANDA, NEW YORK

VEHICULAR TRAFFIC SIGNAL SWITCH

Application filed April 5, 1927, Serial No. 181,225. Renewed December 2, 1929.

This invention relates to signaling means for vehicles, and more particularly to such vehicles as are mechanically propelled, of which automobiles are typical.

The object is the provision of a signal light which is under control of the driver and adapted to be set to indicate that a turn is about to be made and which is restored to normal position automatically by the steering wheel when the same is moved to a straight-away position after the turn has been made.

The invention relates to a novel and peculiar switch mechanism and a unique resetting mechanism, automatically operable by the steering wheel, the switch mechanism embodying a few number of parts and utilizing certain switch elements as means for holding the pivoted switch member in normal position, thereby obviating the necessity for providing additional springs and stops for such purpose.

The invention furthermore contemplates novel means for mounting the switch upon the steering post, thereby adapting the invention for general application to motor vehicles of different makes.

While the drawings illustrate a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a side view of the upper portion of a steering post and associated steering wheel, provided with a signal light switch mechanism embodying the invention.

Figure 2 is an enlarged sectional view on the line 2—2 of Figure 1, looking in the direction of the arrows.

Figure 3 is a sectional view of the switch on the line 3—3 of Figure 2.

Figure 4 is a sectional view on the line 4—4 of Figure 3.

Figure 5 is a sectional view on the line 5—5 of Figure 4.

Figure 6 is a diagrammatic view illustrating the signal light circuit.

Corresponding and like parts are referred to in the following description and designated in the several views of the drawings by like reference characters.

The numeral 1 designates the usual steering post of a motor vehicle and 2 the steering wheel associated therewith. These parts are illustrated to demonstrate more clearly the application of the invention. A bracket 3 is mounted upon the steering post 1 and secured thereto by means of a shackle 4 which embraces the steering post and has its threaded ends engaging terminal portions of a depending portion of the bracket, which as shown most clearly in Figure 2 of the drawings, is cut away to receive the steering post, the cut away portion being of V-outline to adapt the bracket to different sizes of steering posts. A box 5 is attached to the V-bracket 3 and provides a housing for the switch mechanism and may be of determinate construction. A shaft 6 extends through the box 5 and is mounted in the front and rear walls thereof, and is electrically insulated therefrom in any preferred way. A handle 7 is fast to the rear end of the shaft and is conveniently positioned to the steering wheel 2 so as to be readily accessible when it is required to operate the signal light.

A plate 8 within the box or housing 5 is fast to the shaft 6 and carries two pins 9 and 10 which have a parallel relation and project from opposite sides of the plate. These pins constitute bridge pieces whereby to electrically connect the terminals of the respective light circuits. V-shaped contact members 11 and 12 are located within the box or housing 5 and are adapted to cooperate with the pins 9 and 10. The diverging elements 13 comprising the member 11 constitute spring terminals, the ends of which are depressed, as indicated at 13$^a$ and project, as indicated at 13$^b$, to form stops. The diverging elements 12$^a$ of the member 12 constitute spring terminals, the end portions of which are similarly depressed and extended in substantially the same manner as the end portions of the spring terminals 13. Other spring terminals 14 are provided to cooperate with the spring terminals 12ª and are reversely disposed, their end portions being depressed, as indicated at 14ª and extended to provide stops 14ᵇ. The parts are arranged so that normally the pins 9 and 10 engage the extended ends 13ᵇ and 14ᵇ of the respective spring terminals 13 and 14 without touching the spring terminals 12ª, hence the light circuits are normally open. When the shaft 6 is turned in a clock-wise direction the pin 10 is depressed and engages the spring terminal 12ª, thereby closing the light circuits. The pin 10 snaps into the depressions of the several spring terminals 13, 14 and 12ª and is retained in such position until the switch is tripped and restored to normal position when the steering wheel is set to direct the vehicle straight ahead after the indicated turn to the right has been made. When the shaft 6 is turned in a counter-clock-wise direction the pin 9 is depressed, and makes contact with the element 12ª, thereby connecting the left hand light circuits, and indicating the intention of the driver to make a left turn. The pin 9 snaps into the depressions of the spring terminals 13, 14 and 12ª and is retained in such position until the switch is tripped by turning the steering wheel 2 to direct the vehicle straight ahead after the left turn has been made. When the switch is in neutral position, the pins 9 and 10 are engaged by the terminal extensions of the elements 13 and 14, and clear the spring terminals 12ª, hence the light circuits are opened. It will thus be understood that the extensions of the spring terminals 13 and 14 constitute stops and guides and obviate the necessity for providing extraneous stop and guide means.

Referring to the diagrammatic view, Figure 6, the letters "L", "R" and "N" designate three lamps, adapted to indicate direction, "R" referring to the right, "L" to the left, and "N" being neutral and supplementing and coacting with each of the other two lamps. The letter "B" designates a battery or source of current supply for the light circuits. A conductor 15 connects one pole of the battery "B" with the member 12. A conductor 16 connects the other pole of the battery "B" with a terminal of each of the lamps L, N and R. Conductors 17, 18 and 19 connect the other terminal of the respective lamps with the terminals 14, 11 and 14 respectively, it being observed that the wires 17 and 18 are connected to the left hand and the right hand terminals 14. It will be readily perceived that the neutral lamp N is included in each of the circuits of the lamps L and R. When the handle 7 is turned to the right both lamp circuits including the lamps R and N are closed, and when the handle 7 is turned to the left, both light circuits including the lamps L and N are closed. The several lamps are suitably encased and are adapted to display a conventional signal to indicate that the driver is about to make a turn either to the right or to the left according to the movement of the handle 7 to close the proper light signal circuits. It is proposed to utilize an arrow which includes oppositely pointing heads and a common shaft. The neutral lamp N illuminates the shaft whereas the lamp R illuminates the head pointing to the right and the lamp L illuminates the head pointing to the left.

A plate 20 is fast to the forward end of the shaft 6, beyond the box or housing 5, and has an extension 21 at the center of its lower edge which forms stop shoulders to limit the movement of dogs 22 which are pivoted intermediate their ends to side edge portions of the plate 20. A contractile spring 23 connects the dogs 22 below their pivots and holds them in contact with the stop shoulders provided by the extension 21, the dogs being formed with rearwardly projecting lugs or flanges at their lower ends to impinge against the side edges of the extension, as shown in Fig. 4. The upper ends of the dogs 22 are beveled, as indicated at 24. Normally the dogs 22 occupy a vertical position, as indicated by full lines in Figure 5 and assume an inclined position accordingly as the shaft 6 is turned to the right or to the left. A pair of pins 25 project from the hub of the steering wheel, and are adapted to cooperate with the respective dogs 22. Assuming that the handle 7 is turned to the left, the pin 9 is depressed and bridges the spring terminals at the left and closes the light circuits through the lamps L and R. This causes the plate 20 and dogs 22 to assume the position indicated by the dotted lines in Figure 5. The signal circuits are closed in advance of making the turn, thereby giving ample warning of the intention of the driver. When the steering wheel 2 is turned to direct the vehicle around the corner, one of the pins 25 rides against the upper projecting end of the right hand dog 22 which pivots against the tension of the spring 23 to admit of the pin 25 clearing the same. After the turn has been made and the steering wheel 2 is turned to direct the vehicle straight ahead the pin 25 previously clearing the dog 22 engages the beveled edge thereof and actuates said dog, but this time the force is applied to the plate 20 through the lug or flange at the lower end of the dog so that the plate 20 and the shaft 6 are rocked to normal position, thereby tripping the switch and automatically breaking the light circuits previously closed and restoring the switch to normal position, as will be readily understood.

A pair of contacts 26 is located at each side of the box or housing 5 and the contacts of each pair are adapted to be bridged by the respective circuit closing pins 9 and 10. Corresponding contacts of each pair are electrically connected, as indicated most clearly in Figure 3. When the set or group of contacts at the right are closed by the pin 10, the pair of contacts 26 at the left are closed by the pin 9 and vice versa. These pairs of contacts 26 are included in a circuit which contains a device 27 for interrupting the circuit whereby to produce a flash signal instead of a continuously illuminated signal, thereby being more attractive. Binding posts 28 have the pairs of contacts 26 electrically connected thereto, and these binding posts are adapted to have the lead wires from the battery or source of supply connected thereto. Binding posts 29 applied to the bottom of the box or housing 5 have the respective contacts 11, 12 and 14 connected thereto and the lead wires from the battery in connection therewith.

Having thus described the invention, I claim:

1. A signal circuit closing switch comprising a switch member, a circuit closing pin carried by the switch member, two circuit closing terminals disposed to engage the circuit closing pin at different points in its length and upon opposite sides, and a third circuit closing terminal normally out of contact with the circuit closing pin and adapted to be engaged thereby to effect a closing of the signal circuit.

2. A signal circuit switch comprising a member, a circuit closing pin carried thereby, two circuit closing terminals disposed in contact with the circuit closing pin at spaced points in the length thereof, and a third circuit closing terminal normally out of contact with the circuit closing pin and adapted to be engaged thereby to close the circuits, said circuit closing terminals having depressed portions to engage the circuit closing pin by a snap action and hold the same in operative position.

3. A signal switch comprising a switch member, a circuit closing pin carried thereby, two spring contacts arranged in contact with the circuit closing pin at spaced points in the length thereof and upon opposite sides, and a third spring contact normally clear of the circuit closing pin and common to both circuits and adapted to close the same when the switch member is operated, the spring contacts having depressed portions to engage the circuit closing pin by a snap action.

4. A signal switch comprising two sets of oppositely disposed contacts, each set including two contacts longitudinally and transversely spaced, and a third contact common to the circuits including the two before mentioned contacts, a switch member and circuit closing pins carried by the switch member and adapted to alternately cooperate with the contacts of the different sets and normally held in a given position by the said pins engaging the longitudinally and transversely spaced contacts of both sets, the several contacts having depressed portions to engage the circuit closing pins by a snap action.

In testimony whereof I affix my signature.

WALLACE W. BUGH.